(12) United States Patent
Newell et al.

(10) Patent No.: US 8,009,815 B2
(45) Date of Patent: Aug. 30, 2011

(54) MESSAGE DISTRIBUTION SYSTEM

(76) Inventors: Thomas James Newell, Arlington, VA (US); Bradley Jacob Nathan, Alexandria, VA (US); David Justin Bergert, Clifton, VA (US); Richard Shannon Smith, Hamilton, VA (US)

( * ) Notice: Subject to any disclaimer, the term of this patent is extended or adjusted under 35 U.S.C. 154(b) by 1405 days.

(21) Appl. No.: 11/510,230

(22) Filed: Aug. 25, 2006

(65) Prior Publication Data
US 2007/0047702 A1   Mar. 1, 2007

Related U.S. Application Data

(60) Provisional application No. 60/711,280, filed on Aug. 25, 2005.

(51) Int. Cl.
*H04M 11/00* (2006.01)
(52) U.S. Cl. .................. 379/101.01; 379/88.25
(58) Field of Classification Search .......... 379/68–88.28, 379/101.01, 93.01; 370/390
See application file for complete search history.

(56) References Cited

U.S. PATENT DOCUMENTS

| | | | |
|---|---|---|---|
| 5,732,216 A | 3/1998 | Logan | |
| 5,828,730 A * | 10/1998 | Zebryk et al. | 379/88.27 |
| 5,862,325 A | 1/1999 | Reed | |
| 5,930,341 A * | 7/1999 | Cardillo et al. | 379/93.25 |
| 6,215,858 B1 * | 4/2001 | Bartholomew et al. | 379/88.17 |
| 6,383,074 B1 * | 5/2002 | Boggs | 463/25 |
| 6,442,250 B1 * | 8/2002 | Troen-Krasnow et al. | 379/93.15 |
| 6,493,558 B1 * | 12/2002 | Bernhart et al. | 455/466 |
| 6,665,379 B1 | 12/2003 | Brown | |
| 6,670,537 B2 * | 12/2003 | Hughes et al. | 84/609 |
| 6,731,625 B1 | 5/2004 | Eastep | |
| 6,754,181 B1 | 6/2004 | Elliott | |
| 6,826,416 B2 * | 11/2004 | Anson et al. | 455/566 |
| 6,895,234 B1 * | 5/2005 | Laursen et al. | 455/403 |
| 7,046,777 B2 * | 5/2006 | Colson et al. | 379/142.06 |
| 7,142,648 B1 * | 11/2006 | Miller | 379/88.23 |
| 7,408,106 B2 * | 8/2008 | Weiner et al. | 84/610 |
| 2002/0059104 A1 * | 5/2002 | Fukushima | 705/22 |
| 2002/0072925 A1 * | 6/2002 | Krim | 705/1 |
| 2003/0115288 A1 * | 6/2003 | Ljubicich et al. | 709/219 |
| 2004/0139004 A1 * | 7/2004 | Cohen et al. | 705/39 |
| 2004/0143650 A1 * | 7/2004 | Wollowitz | 709/219 |
| 2005/0010573 A1 * | 1/2005 | Garg | 707/10 |

\* cited by examiner

*Primary Examiner* — Fan Tsang
*Assistant Examiner* — Assad Mohammed
(74) *Attorney, Agent, or Firm* — Nathaniel Gordon-Clark

(57) ABSTRACT

The invention is a message distribution system that can deliver a single message to a large number of people with a single act using a group of computer servers. The preferred embodiment requires the user to establish an account using a website and enter a contact list. The contact list can include both email addresses and telephone numbers. When the user wishes to send a message, at a later time, the user contacts the group of computer servers by a telephone number or email address. The user records a message on the servers and the server sends the messages to all email addresses and telephone numbers on the contact list for that user. Other embodiments include procedures to confirm the validity of the email addresses and telephone numbers and to confirm the delivery of messages to the email address and telephone numbers on the contact list.

1 Claim, 5 Drawing Sheets

Servers

Registration Stage

Distribution Stage

Automated Conformation of Contact Information Stage

Message Delivery Confirmation

Servers

MESSAGE DISTRIBUTION SYSTEM

CROSS-REFERENCE TO RELATED APPLICATIONS

This application claims the benefit of Provisional Patent Application Ser. No. 60/711,280, filed Aug. 25, 2005 by the present inventor.

FEDERALLY SPONSORED RESEARCH

None

SEQUENCE LISTING OR PROGRAM

None

FIELD OF INVENTION

This invention relates to message systems. More specifically it relates to automatic message systems. Even more specifically it relates to automatic message systems that allows users to distribute emergency voice messages to family members.

BACKGROUND OF THE INVENTION

"Auto-dialers" are known devices in the prior art. The limitation of "auto-dialers" is that each person or organization that wishes to use one must own an individual machine. Furthermore, the person must reprogram the machine each time it is used. This includes programming both the message and the list of phone numbers. In addition, "auto-dialers" can only send messages through the phone, but not through modern communication technology like email.

Furthermore, "auto-dialers" cannot be accessed remotely. Thus each "auto-dialer" must use the local phone system to make calls. In an emergency, the "auto-dialer" will lose its effectiveness if the local phone system has failed.

Phone trees are a known method of distributing information. The idea is that one person calls the next few people and distributes information that way. The concept relies on the use of a large number of people and the "many hands make light work" principle. By having many people making calls, the burden on any one person is small, but the number of messages distributed is large. This system has the weakness that it cannot work without a large number of people. Furthermore, this large number of people means that the message may change as each person restates the message. In addition, each person must use the local phone system that they have access to. This means that the phone tree will break down when the local phone systems itself has failed.

The present invention solves these problems by creating an automated message distribution system that must be accessed remotely and can make both phone calls and send emails and text messages according to a predetermined contact list. Thus a message sender can rely on the fact that as long as the sender can contact the message distribution system once, the sender can send a customized message to the predetermined contact list and be assured that the messages will be sent because the message distribution system can utilize portions of a communications network that have not been effected by a local failure. This is especially helpful in an area where the failure of the phone network is spreading. Furthermore, the user has confidence that the present invention will keep trying to deliver the message by phone and email until it is successfully delivered by both.

SUMMARY OF INVENTION

This invention is a message distribution system.

This invention is a method to allow regular people to access an "auto-dialer" system without needing to purchase expensive or complex machinery. Traditionally, auto-dialers have been used by business to distribute a single message to a large numbers of people. This invention allows one to person to contact a group of people with a single phone call. The invention is an automated phone tree for individuals and families. The invention allows an individual to record a message in a short period of time and send that message to friends and family by having the automated phone tree dial preprogrammed phone numbers and email addresses. Thus the invention allows individuals to deliver the same message to a multiple of friends and family with a single call to a toll free number that is delivered immediately or at a time set by the individual. The preferred embodiment envisions the use of the service to spread emergency information between individuals, but any message could be sent between individuals with this invention. Furthermore, the invention allows one person to create accounts for friends and family so they will also be able to send emergency messages to preprogrammed phone numbers and emails. An example would be a subscription given as a gift.

Businesses or other organizations can also use this service to distribute messages to employees, members or customers.

The invention allows a user to enter a list of predetermined phone numbers and email addresses into the system. Later, when the user activates the invention, the user can then, at that time, or at a later time, record a voice message. The invention will then deliver the voice message to the predetermined numbers and email addresses. In a preferred embodiment, alternatively, the user can, at a later time, with a touch of a single button, call a toll-free number and record a voice message. In other embodiments, the user can, at the time of entering the list of predetermined phone numbers and email addresses record a voice message, or at a later time, call a toll-free number and record a voice message. In other embodiments, the user can, at the time of recording the voice message select a delivery time for the message to the predetermined phone numbers and email addresses.

The invention comprises a computer server or a group of computer servers. In the preferred embodiment, the group of servers includes at least one server for the website, one for the database of predetermined phone numbers and email addresses, one for the voice recording process, one for the outgoing phone calls and one for media storage. Collectively, these servers have the capacity to receive and store voice messages among other things. The invention is a method use for these servers by which the servers can receive a list of phone numbers and email addresses. The invention is a method use of servers to automatically confirm, on periodic basis, the phone numbers and e-mails of each person on the automated list and to allow for each such person to edit and store that information. Then at that time, or at a later time, the servers can receive a voice message that the servers will then distribute to the phone numbers and the email addresses. The invention includes a method of use of servers to track the delivery status of messages by the telephone and email and to provide the status of delivery to each telephone number or email address.

Stages of Operation of the Invention

The invention has a registration stage and a distribution stage. In addition, some embodiments of the invention can have two optional stages, an automated confirmation of contact information stage and a message delivery confirmation stage. During the registration stage, the user enters a list of phone numbers and email addresses. During the distribution stage, the user enters a message into the invention that is then delivered to the predetermined phone numbers and email addresses by the invention. During the automated confirmation of contact information stage, the user has the list of phone numbers and email addresses validated automatically and independently by each person on the predetermined contact list. During the message delivery confirmation stage, the user receiver an email or telephone call that includes the message delivery status of each telephone message and email message to each of his recipients.

The registration stage can be completed using a computer or a phone. In the computer embodiment, the user accesses a website. The website offers the user the option to enter a distribution list. The user activates this option and goes to a webpage that allows the entry of phone numbers and email addresses. The user then enters a list of phone numbers and email address. This list of phone numbers and email addresses is then uploaded to the database server or group of servers. In the telephone embodiment, the user dials an access number and is presented with a voice menu or a person acting as the operator. One option on the voice menu is to enter a new distribution list. The user activates this option and is asked to enter a phone number or email address. The user is then offered the option to add an additional phone number of email address, or alternatively, to stop entering phone numbers and email addresses and quit the system. In the embodiment where a person is acting as the operator, the person is told the phone numbers and email addresses and enters this information into the database server or group of servers via a web interface.

In the computer accessed embodiments of the registration stage, the user accesses a website. The website offers the user the option to enter a distribution list. The user activates this option and goes to a webpage that allows the entry of phone numbers and email addresses. The user then enters a list of phone numbers and email address. This list of phone numbers is then uploaded to the servers of the invention operators. In some versions of the invention, the user can also create an account for others to create their own distribution lists, for example, and not meant as a limitation in any way, a gift subscription. The user could be given this option when the user first creates an account with a distribution list. Alternatively, the user could create accounts, for example, and not meant as a limitation in any way, gift subscriptions, for others at another time. The operator of this invention could make this option available as a marketing and advertising tool.

The invention can use a server or a group of servers. In the preferred embodiment, the group of servers includes a server for the website, a database server, a server for outgoing phone calls and a media storage server to store the voice messages. As an example, and not meant as a limitation in any way, the preferred embodiment envisions a person accessing a website server in the registration stage. The invention then uploads the user information onto the database server. When the user acts as a sender and activates the distribution stage by calling the website server, the website server confirms the sender's account number by communicating with the database server via the web server. Then the website server records the message from the sender by storing the message as an audio file in the media storage server. Once the user records the message the website server confirms the predetermined list of phone numbers and email addresses uniquely associated with the sender's account number and forwards the media ID, phone numbers and email addresses to the phone server for the delivery of the messages by phone and the website server for the delivery of the messages by email.

In the automated confirmation of contact information stage, the invention confirms both the phone number and the e-mail address for each person on the predetermined list. The invention automatically dials the phone number for each person on the predetermined list and confirms the e-mail address for that person. The invention uses a phone server to make the outbound call. The phone server uses an automated interactive voice recognition (IVR) system, a text-to-speech program to read the e-mail address to the person and an interactive IVR response that confirms the e-mail address. If the person does not confirm the e-mail address, the invention through the IVR system asks the person to spell the e-mail address and then a speech-to-text program converts the e-mail address to text. The invention then applies the text-to-speech program and reads the e-mail address and asks that the person press one to confirm the revised e-mail address.

The invention also automatically sends an e-mail to each person on the predetermined list and asks that they confirm the phone number through the web interface. If the phone number is correct, that confirmation is stored in the database server. In the preferred embodiment, each person will be given the option on the website to click a button labeled "Correct" for that person's contact information. If the person clicks the "Not Correct" button, a web form asks that that the person enter the correct phone number. Once that correct number is entered, the person is asked to confirm it and then the invention uploads the phone number into the database server. The invention then sends an e-mail to the user (not the recipient) and informs the user that the emergency contact information has been updated automatically and displays it for the user.

Alternatively, the invention can send a written confirmation of the phone numbers and email addresses by post.

The distribution stage can be completed by calling a toll free phone number. In the preferred embodiment, the toll free phone number is stored on the user's mobile phone. The user calls the toll free number and then accesses the user's account using a unique identifier. In the preferred embodiment, the identifier is the user's home or mobile phone number. The user then records a message. This message is then sent to all the phone numbers and email addresses on the user's list. The emails can contain a link to an audio file of the message, an audio file of the message or the text of the message. In the preferred embodiment, the message will be included in the email as a link to an audio file that is stored on a media server that holds media files. The media files could be any format, for example, and not meant as a limitation in any way, such as MP3, AAC, or WAV. If the message is attached to the email, the message can be in a playable audio format, for example, and not meant as a limitation in any way, such as MP3, AAC, or WAV format. Alternatively the message can be transcribed into text and pasted into the email.

The distribution stage can also be completed by sending a text message. In this embodiment, the user sends a text message to an activation number. The text message would include a unique identification number, like the user's home phone number or mobile phone number and a message. Another alternative is a text message that does not contain a message, just an identification number, pin, or both, and causes the server to send a prerecorded message.

The message can also be distributed by text message. In this case, the text message will contain the text of the message, or contain a phone number, website or email address to retrieve the message.

In the preferred embodiment of the distribution stage, the invention includes a confirmation of message delivery stage. In the message delivery confirmation stage, the user is contacted by the computer server or group of computer servers and is informed that the message was delivered to each phone number and email address on the distribution list. In the case of email addresses, the computer server or servers will inform the user if the message with rejected or accepted by the email address. In some embodiments, the computer server or servers will tell the user when the email has been read. In the case of messages delivered to phone numbers, the computer server or servers will state if the phone call was picked up, encountered a busy signal or the phone number was not operational. The computer server or servers can use email to inform the user of the status of each message, or can call the user on the telephone and use a prerecorded message to inform the user of the status of each message. In some embodiments, the computer server or servers could send the user of text message with the status of each message. In other embodiments of the invention, the user could read a report on the status of each message from the computer server or servers and send a message to the user by email or telephone.

BRIEF DESCRIPTION OF THE DRAWINGS

The accompanying drawings, which are incorporated in and form part of the specification, illustrate the embodiments of the present invention and, together with the description, serve to explain the principles of the invention.

DETAILED DESCRIPTION OF THE DRAWINGS

Figure 1:
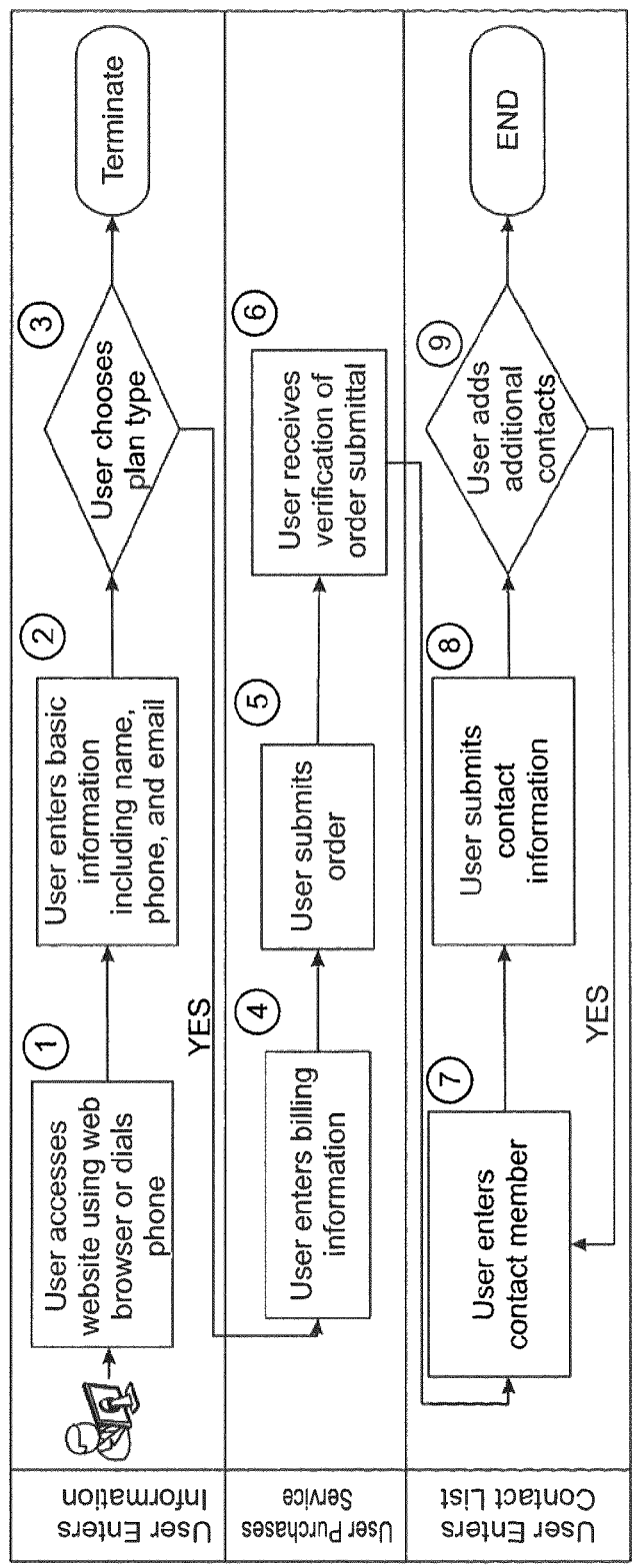
FIG. 1 illustrates the registration stage flowchart.

FIG. 1 illustrates the registration stage flowchart. This flow chart describes the process by which the invention registers a new user. In step 1, the user contacts the computer server that is operating the invention by a website or phone number. Then, in step 2, the server asks the user to enter basic information such as name, phone number and email address. Then, in step 3, the server asks the user to select a service plan. If the user does not select a service plan, the invention terminates. If the user selects a service plan, then the invention goes to step 4 and asks the user to submit billing information. Then, in step 5, the server submits the order. Then, in step 6, the user receives verification that the order has been submitted. Then, in step 7, the user enters a person to be added to that user's distribution list. Then, in step 8, the server asks the user to enter contact information for that person, including at least a phone number or an email address, or both. Then, in step 9, the server offers the user to option to add another person to the distribution list. If the user elects to add another person, the invention returns to step 7 and add another person and the contact information. If the user elects not to add another person, the invention ends its process. The user can access his account through a website using his account number and enters more contact information at a later time.

Figure 2:
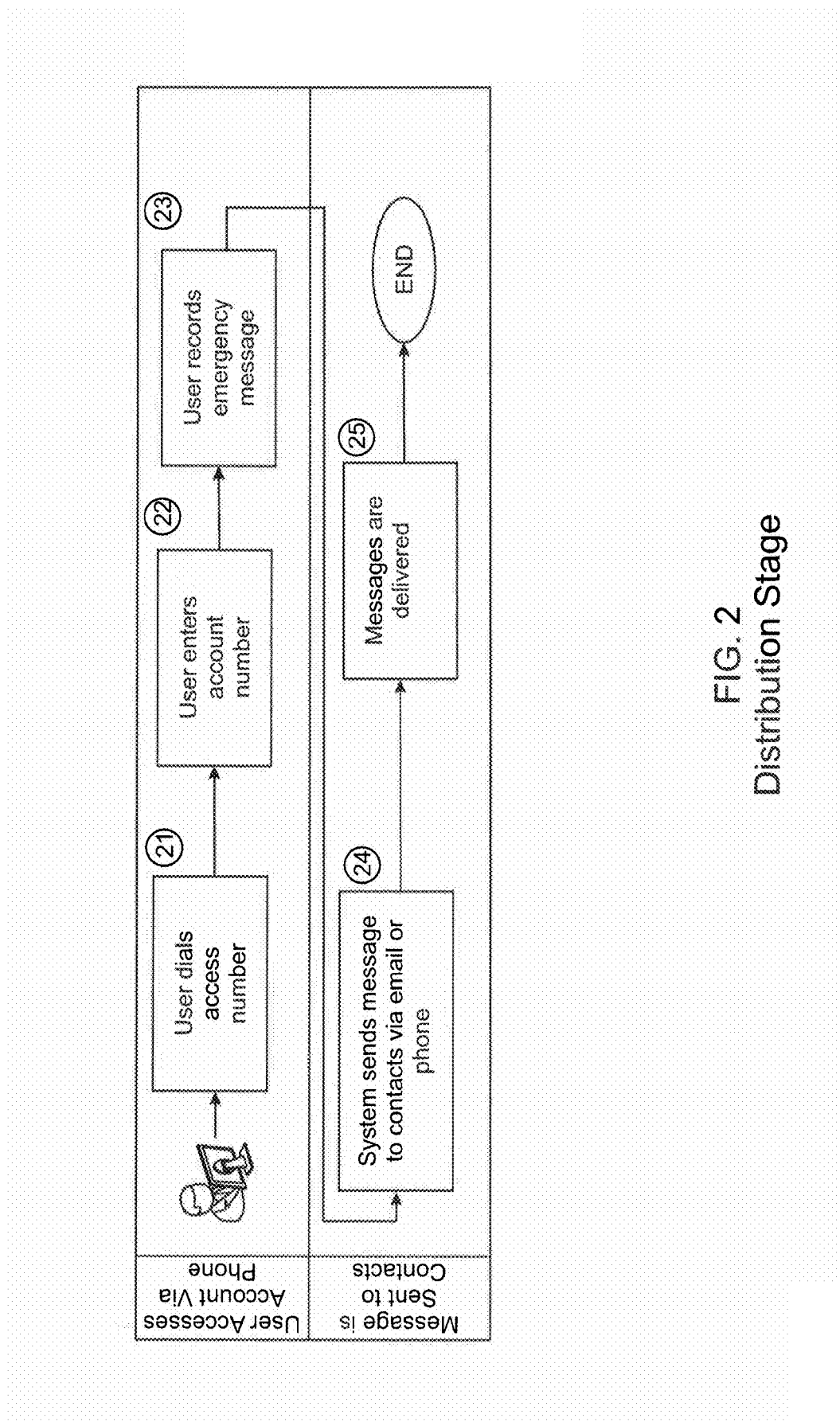
FIG. 2 illustrates the distribution stage flowchart.

FIG. 2 illustrates the distribution stage flowchart. This flowchart describes the process by which the invention distributes a message to the persons on the distribution list. In step 21, the user dials a toll free access number. Then in step 22, the user is prompted to enter an account number and the user enters an account number. Then, in step 23, the user records a message with a voice recording software. Then, in step 24, the server sends that message to each phone number and email address on the user's distribution list. Thus, in step 25, the message is delivered to all the people on the distribution list.

Figure 3:
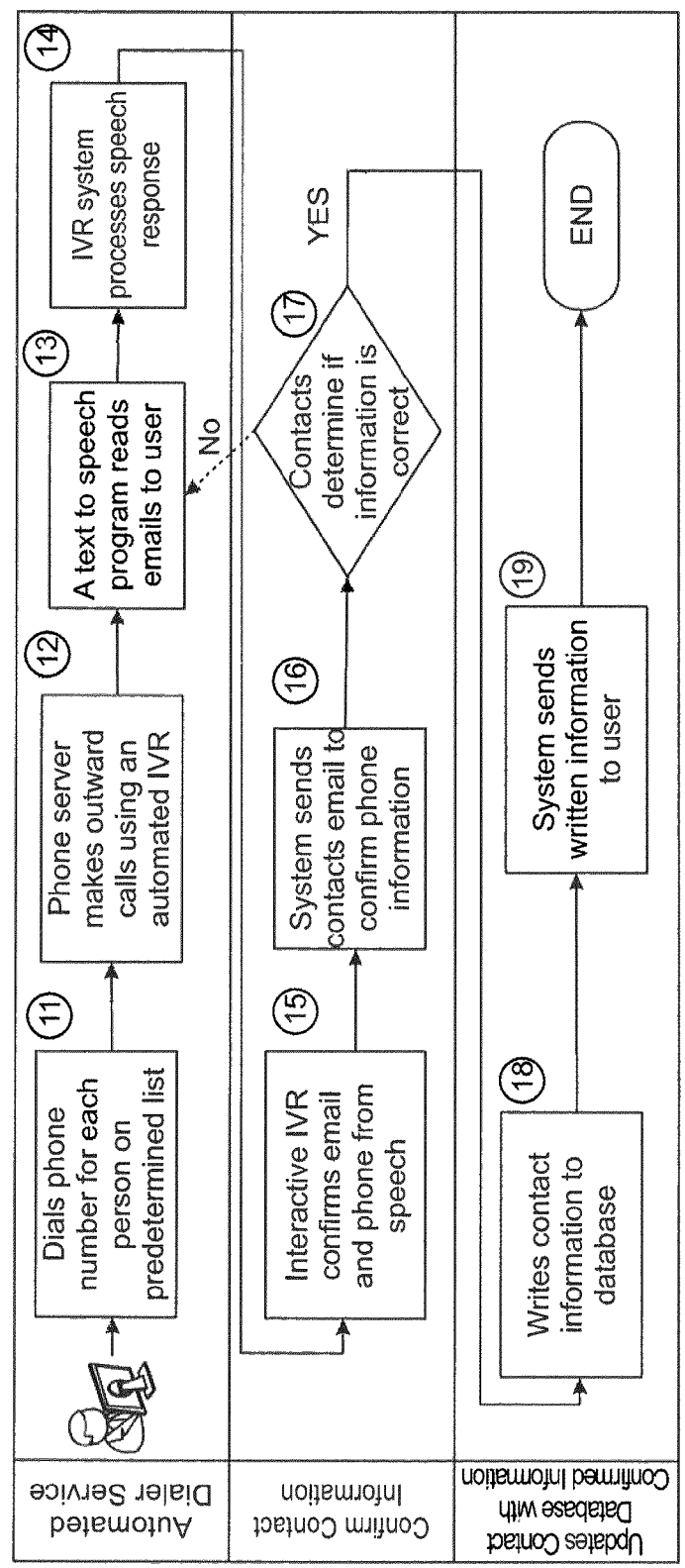
FIG. 3 illustrates the automated confirmation of contact information stage flowchart.

FIG. 3 illustrates the automated confirmation of contact information stage flowchart. This flow describes the process by which the invention confirms the contact information on each user's distribution list. In step 11, the computer server dials the phone number for each person on the predetermined list. Then, in step 12, the phone server uses an outbound call using interactive voice recognition software (IVR). Then, in step 13, a text to speech program reads the email address for that phone number to the person the server called. Then, in step 14, the IVR processes the response from the person and converts the speech into text. Then in step 15, the IVR system confirms that the phone number and email address are correct using a text to speech program. Also, in step 16, the server sends the person an email with the person's phone number to confirm that the email address and phone number are correct. This email can be sent while the person is on the phone, or this email can be sent later when the person has hung up the phone. Then, in step 17, the person determines if the phone number and the email address are correct. If the person states that information is correct then the invention advances to step 18. If the person states that information is not correct, the invention returns to step 13. In step 18, the server writes the phone number and email address into the database of the server for that user's distribution list. Then in step 19, the server sends a written confirmation that the phone number of the email has been confirmed to both the user and the person on the user's distribution list. Alternatively, the server can send a written confirmation to either the user or the person.

Figure 4:
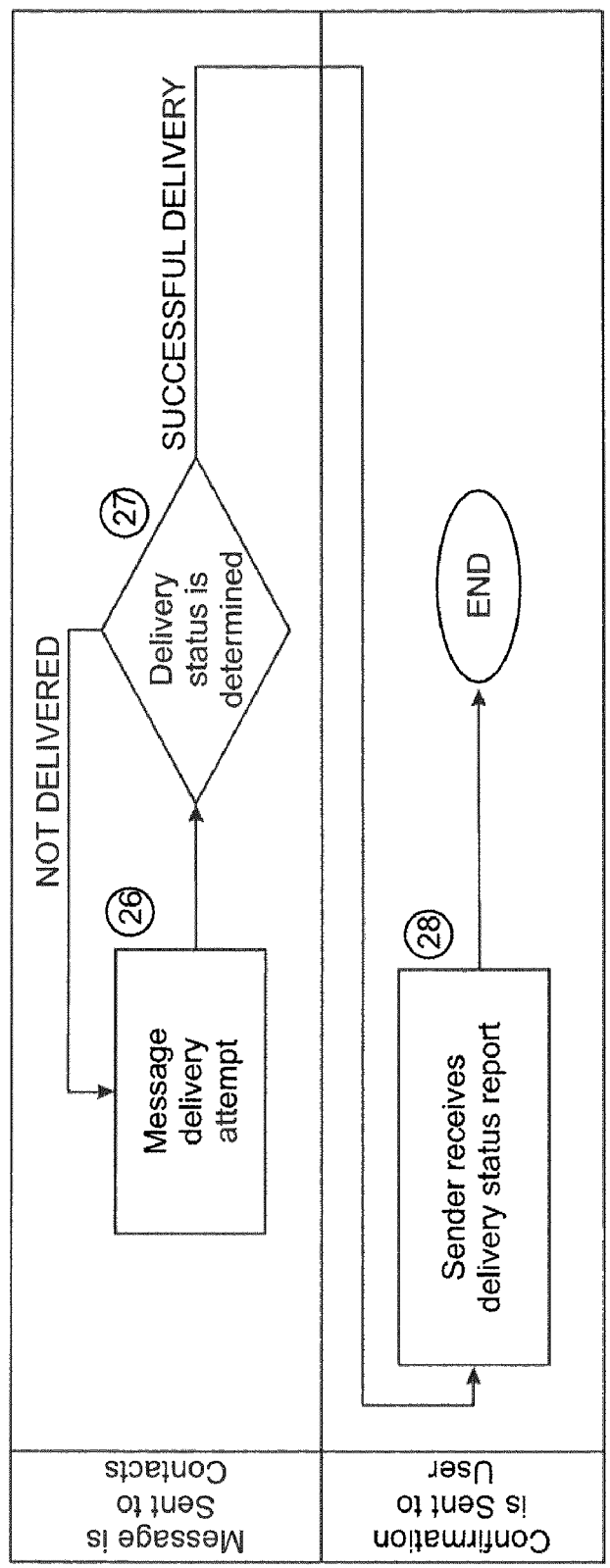
FIG. 4 illustrates the message delivery confirmation stage flowchart.

FIG. 4 illustrates the message delivery confirmation stage flowchart. In the message delivery confirmation stage, the messages are delivered in step 26. Then in step 27, delivery status is determined. If the messages have not been delivered, then step 26 is repeated. If the messages have been delivered, the user receives a delivery status report in step 28.

Figure 5:
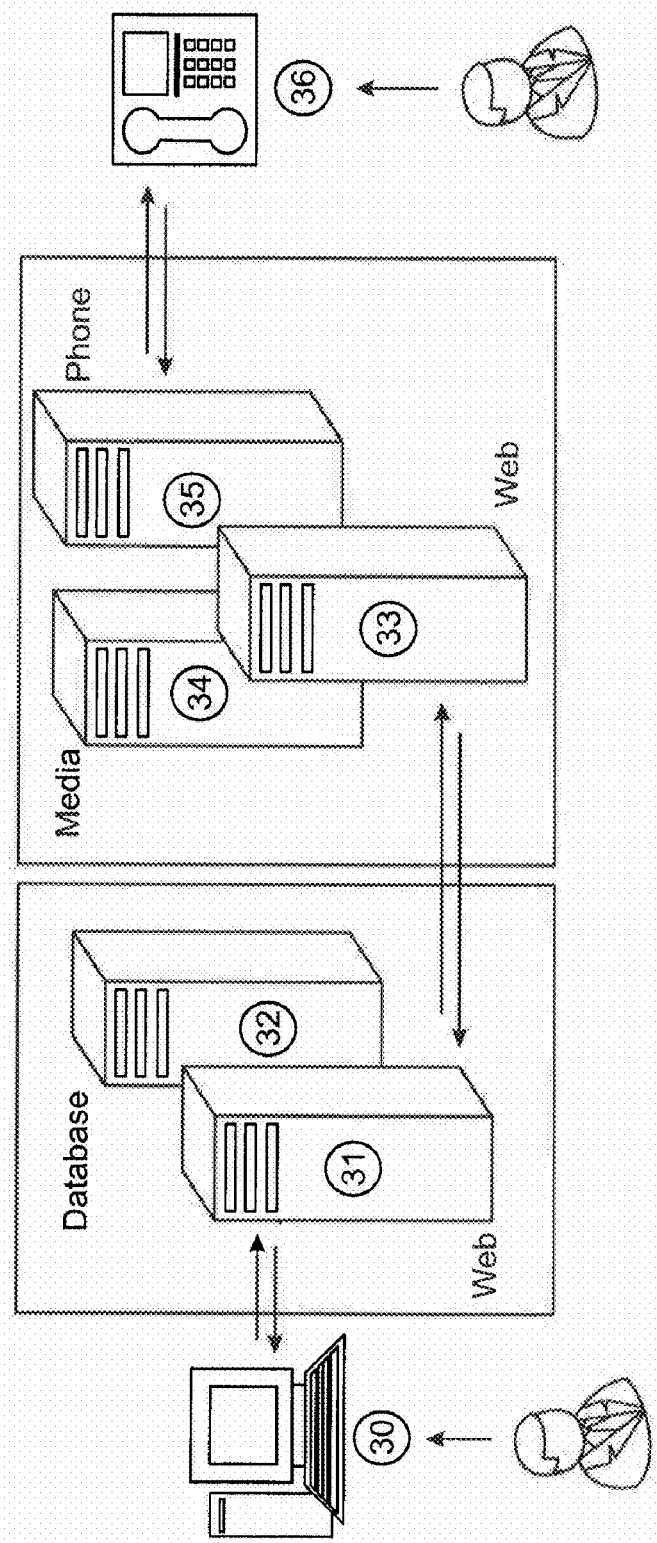
FIG. 5 illustrates a diagram of the relationship between a group of servers.

FIG. 5 illustrates the relationship between a group of servers. A computer 30 communicates with a database server 32 via a web provider server 31. The web provider server 31 communicates with other web provider's server 33, as well as media server 34 and phone server 35. The phone server 35 communicates with a phone 36. In the registration stage, the computer 30 communicates with the database server 32 via the web provider server 31 so that the user can complete steps 1 to 9. In the distribution stage, the phone 36 communicates with the phone server 35. The phone server 35 communicates with the web provider server 33 and the media server 34. The web provider server 33 also communicates with the database server 32 through the web provider server 31. Thus the distribution stage can complete steps 21 to 25. This is a preferred embodiment of a group of servers. Any combination of servers that can perform the registration stage and the distribution stage can be used.

In the distribution stage, the user uses a phone 36 to dial an access number in step 21. The user uses a phone 36 to connect to the phone server 35. The phone server 35 uses interactive voice recognition software (IVR) to ask the user for an account number via a phone 36. The user enters an account number and completes step 22. The account number is communicated from the phone 36 to the phone server 35 to the web server 33 to the web server 31 to the database server 32. The database server 32 confirms the account number, sends the confirmation back through the web provider server 31, which forwards the confirmation to web provider server 33 to the phone server 35 that uses an IVR to ask the user to record his voice message via his phone 36. To complete step 23, the user records a voice message on phone 36 that is sent to phone server 35. Phone server 35 sends the message to media server 34 for storage and also stores the media identification number for that voice message in the database server 32 via the two web provider servers 31 and 33. Phone server 35 also sends a message to web provider server 31 through web provider server 33 to deliver the user's message. Web provider server 31 collects the contact list from the database server 32 for that user and the associated media identification number for that voice message. Web provider server 33 collects the user's message from media storage server 34 using the unique media identification number. Web server 33 forwards the phone numbers and the voice message to the phone server 35 for delivery by phone 36. Then the web provider 31 sends the user's message to all the email addresses on the user's contact list. In some cases, the message is stored as a file in the media storage server. An email sent to a recipient can contain a link to the file in the media storage server 34, rather than a message. When the recipient clicks on the link, the web provider server 31 or 33 contacts the media storage server 34 and opens the file for the recipient.

In some embodiments of the registration stage, step 4 can be omitted. In this version, the user has been given a gift account and is not billed for the service. Thus the user is not required to enter billing information in step 4.

In other embodiments of the registration stage, a purchaser can buy a large number of accounts by placing an order for multiple accounts in steps 2, 3 and 4. Then the purchaser will skip steps 7 to 9. The user then must repeat step 1 and then skip to step 7 to 9 to enter a contact list.

In some embodiments of the distribution stage, step 23 includes an option to set a date of delivery in the future. In this case, step 23 will also prompt the user to enter the delivery date and time. Then the distribution stage will pause at step 23 until that date and time. At that point, the distribution stage will proceed to step 24 to distribute the messages.

In some embodiments of the message delivery confirmation stage, the invention will only repeat step 26 and step 27 for a certain number of times before proceeding to step 28 regardless of whether the messages were delivered. In other embodiments of the message delivery confirmation stage, if in step 27, the invention determines that the message has not been delivered, the invention will perform steps 28 while it repeats step 26.

Although this invention has been illustrated by reference to specific embodiments, it will be apparent to those skilled in the art that various changes and modification may be made which clearly fall within the scope of the invention. The invention is intended to be protected broadly within the spirit and scope of the appended claims.

What is claimed is:

1. A message distribution system comprising:
    a registration system comprising:
        a plurality of servers;
        a means of contacting the plurality of servers;
        a prompt for a user to create an account;
        a prompt for the user to create an account number;
        a means for the user to enter a single list of telephone numbers and email addresses;
        in the registration process, the user contacts the plurality of servers through the means of contacting the plurality of servers, to create an account and an account number through a means for a user to create an account and an account number and then to enters a list of phone numbers and email addresses through the means for the user to enter a list of phone numbers and email addresses so that the user can create a distribution list;
    a contact information confirmation system that comprises:
        the plurality of servers contacting each phone number and email address on the user's list of phones numbers and email addresses with a message generated by the contact information confirmation system;
        the plurality of servers prompting a recipient to confirm that the phone number or email address supplied by the user for the recipient is correct;
        the plurality of servers then reporting to the user whether each phone number or email address was correct based upon the replies of the recipients;
        so that after the registration process is completed, the contact information confirmation process is completed and the contact information confirmation process is repeated after a predefined period of time and continues to be repeated after the same for another predefined period of time, and;
    a distribution system comprising:
        a means of contacting the plurality of servers;
        a voice recognition software device for the user to enter the account number the user previously created for identifying the user and allowing the plurality of servers to locate that user's single distribution list of phone numbers and email addresses;
        a means for a user to send a user message for immediate distribution to the plurality of servers;
        a means for the plurality of servers to send the user message to the phone numbers and email addresses on the single distribution list of phone numbers and email addresses;
        in the distribution process, the user contacts the plurality of servers through the means of contacting the plurality of servers, accesses the user's account through the voice recognition software device for the user to enter the account number as a means of identifying the user and allowing the plurality of servers to locate that user's single distribution list of phone numbers and email addresses, send a user message to the plurality of servers through the means for a user to send a user message to the plurality of servers, and the plurality of servers distribute the user message to the phone numbers and email addresses on the single distribution list of phone numbers and email addresses that the user entered through the means for the plurality of servers to send the user message to the phone numbers and email addresses of the single distribution list of phone numbers and email addresses;
    a message delivery confirmation system that comprises:
        the plurality of servers deliver the user message to each phone number and email address on the user's single distribution list of phones numbers and email addresses;
        the plurality of servers determine the delivery status of the user message sent to each phone number and email address on the user's single distribution list of phones numbers and email addresses;
        the plurality of servers send the user a status report that demonstrates the status of the user message delivery by phone and by email for each recipient;
        so that after the distribution process is completed, the message delivery confirmation process is completed.

* * * * *